Patented June 2, 1931

1,808,079

UNITED STATES PATENT OFFICE

WILLIAM SEDDON AND ROGER FREDERICK CORDEY, OF COWLEY, OXFORD, ENGLAND, ASSIGNORS TO MORRIS MOTORS (1926) LIMITED, OF COWLEY, OXFORD, ENGLAND

AUTOMATICALLY ADJUSTABLE MECHANICAL STOP OR ABUTMENT

Application filed May 13, 1929, Serial No. 362,786, and in Great Britain November 13, 1928.

This invention has for its object to provide an improved automatically adjustable stop mechanism for use with motor vehicle brakes.

In the two accompanying sheets of explanatory drawings:—

Figure 1:
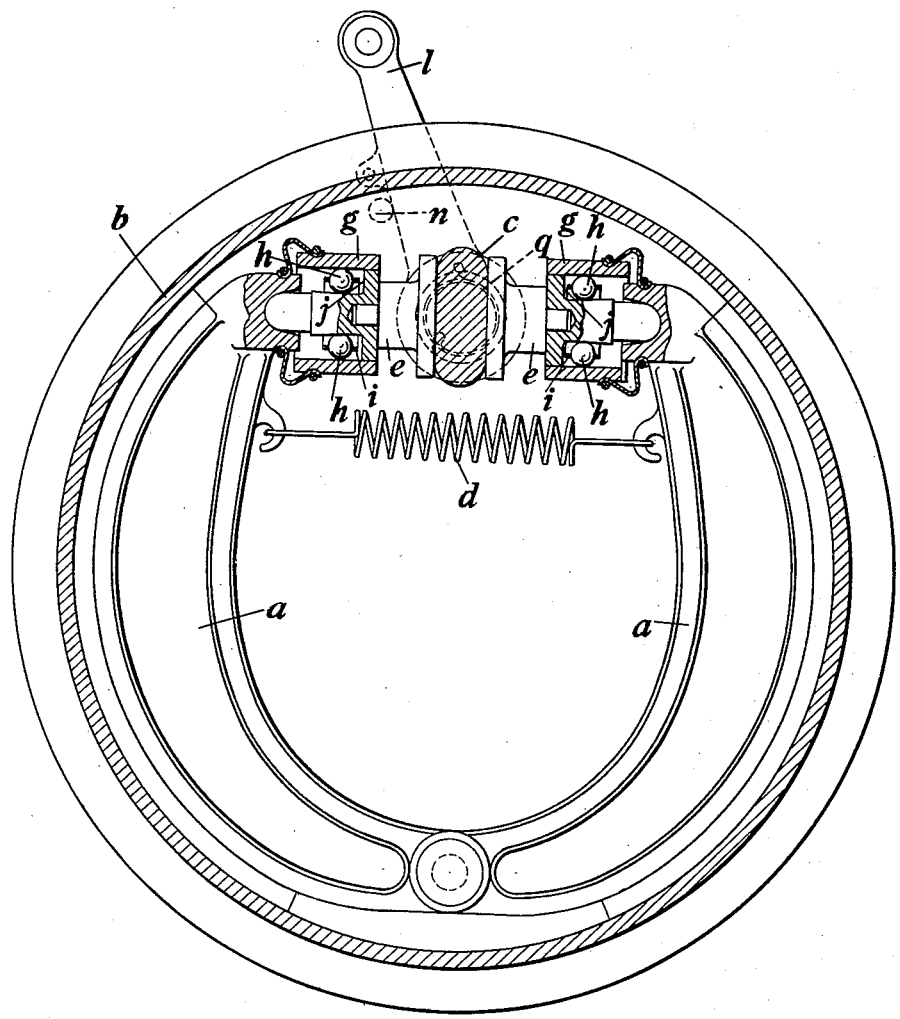
Figure 1 is a side elevation with part in section showing diagrammatically a motor vehicle brake provided with this invention.
Figure 4:
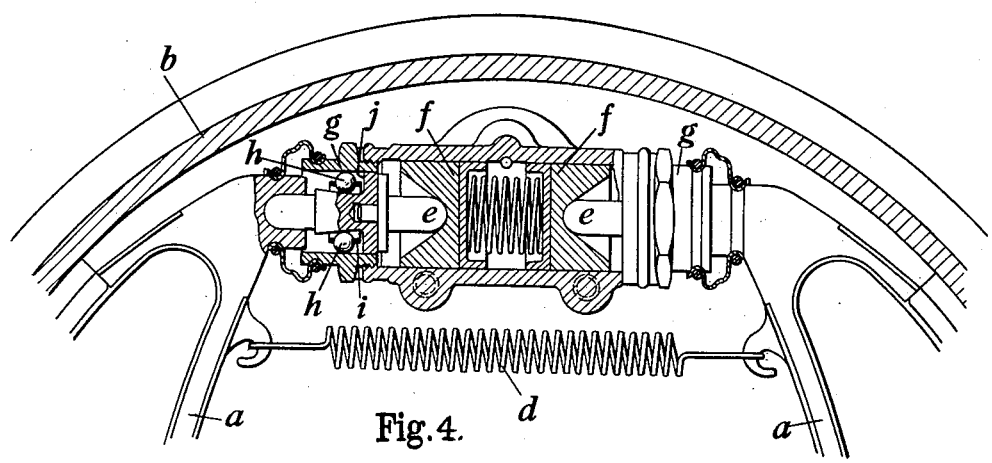
Figure 4 is a side elevation with part in section showing one application of our invention to a hydraulically operated motor vehicle brake.

Referring to Figures 1 and 4, a common form of brake used on motor vehicles comprises a pair of pivoted segmental arms $a$ arranged within a drum $b$, the outer surfaces of the arms being adapted to co-operate with the inner surface of the periphery of the drum. The operative movement of the arms is effected by a cam $c$ (Figure 1) or hydraulic device (Figure 4), and the return movement (which is limited by stops) is effected by a spring $d$. As is well known, it is desirable to keep the amount of movement necessary to bring the arms into action as constant as possible, and to compensate for wear it is therefore necessary periodically to adjust the stops which limit the return movements of the arms. According to the present invention, we arrange the thrust pieces $e$, which transmit the motion of the rotatable cam $c$, or the hydraulic pressure exerted on a pair of pistons $f$ (Figure 4), to the free ends of the arms, to move within cylindrical fixed guides $g$, and within each guide, and surrounding each thrust piece, we arrange a ring of balls $h$, which are held by a resilient cage $i$, the action of the cage (which may comprise a spring strip bent to a circular form) being to hold the said elements in contact with the inner surface of the guide. Also the part of each thrust piece, which co-operates with the ball or roller, is slightly tapered in the direction of its length so as to set up a clutch action during the return movement of the thrust piece. Further the thrust piece is formed with a shoulder or surface $j$ which can engage one side of the cage, when the thrust piece is moved in the direction for applying the brake. The thrust piece may be of any convenient form. In the construction shown it consists of two parts, one acted on by the cam or the hydraulic pistons, and the other acting on the brake arm. But it may be made in one piece.

It will be understood that the desideratum aimed at is to keep the movement of the arms between the "on" and "off" positions of the brake as constant as possible. The design and disposition of the above described parts is therefore such as will allow each thrust piece to move to the required extent independently of the clutch balls, in the forward direction, but in the return direction this free movement is limited by the clutch action of the balls. If and when wear occurs at the brake surfaces necessitating a larger movement of the thrust pieces to bring the brake into action, the ball cage is engaged by the collar or surface $j$ and advanced to a like extent with the thrust piece. The operating member therefore automatically determines the position of the stop, and the range of movement of the brake mechanism is kept constant.

Figure 2:
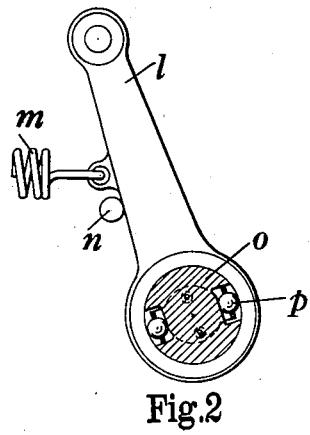
Figure 2 is a part sectional end elevation and Figure 3 a plan of the operating lever.
Figure 3:
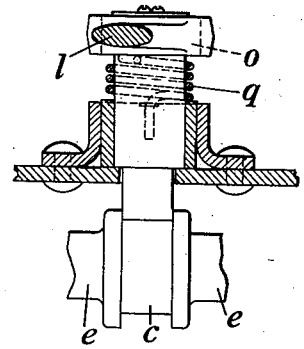

In the example of mechanically operated brakes shown in Figure 1, motion is imparted to the cam by a lever $l$ controlled by a spring $m$, Fig. 2 the lever being actuated through a suitable linkage from a pedal or hand lever. It is desirable that after the brake has been released the lever $l$ should always return into contact with a fixed stop $n$, and it is also desirable that the said lever should operate with a constant movement. To enable this condition to be satisfied we provide a unidirectional clutch connection between the lever $l$ and the spindle of the cam $c$, as shown in Figures 2 and 3. The part $o$ on which the lever is carried is recessed to accommodate clutch rollers or balls $p$, and the recesses are shaped to provide a clutch action between the lever and part $o$. Also the part $o$ which is formed with or connected to the cam has combined with it a spring $q$ which tends to rotate it in the direction for following up the thrust pieces. It will be apparent that the clutch connection between the lever $l$ and part $o$ allows the lever to occupy a fixed initial position under the action of the spring m and to operate with a constant angular movement, whilst the part o is free to keep in contact with the thrust pieces, the positions of which gradually vary to accommodate wear in the brake.

Having thus described our invention what we claim as new and desire to secure by Letters Patent is:—

1. In a motor vehicle brakes, the combination comprising a movable brake member, a thrust piece acting on said member, the said piece being formed with a tapered portion, a hollow cylindrical guide surrounding the thrust piece, a plurality of balls, located between the tapered portion of the thrust piece and the guide, a resilient cage for holding the balls, in contact with the guide and a shoulder on the thrust piece for acting in one direction on the cage, substantially as described.

2. In motor vehicle brakes, the combination comprising a movable brake member, a thrust piece acting on said member, the said piece being formed with a tapered portion, a hollow cylindrical guide surrounding the thrust piece, a plurality of balls located between the tapered portion of the thrust piece and the guide, a resilient cage for holding the balls in contact with the guide, a shoulder on the thrust piece for acting in one direction on the cage, a cam acting on the thrust piece, a lever of actuating the cam, and a unidirectional clutch between the lever and cam, substantially as described.

In testimony whereof we have signed our names to this specification.

WILLIAM SEDDON.
ROGER FREDERICK CORDEY.